United States Patent [19]
Bolivar et al.

[11] Patent Number: 5,022,345
[45] Date of Patent: Jun. 11, 1991

[54] BIRD TOYS

[75] Inventors: LeRoy E. Bolivar; Sharyn L. Bolivar, both of Redondo Beach, Calif.

[73] Assignee: Thee Birdie Bordello, El Segundo, Calif.

[21] Appl. No.: 480,871

[22] Filed: Feb. 16, 1990

[51] Int. Cl.⁵ .............................................. A01K 31/00
[52] U.S. Cl. ............................................ 119/29; 119/26
[58] Field of Search ............... 119/24, 26, 29, 29.5; D30/160

[56] References Cited

U.S. PATENT DOCUMENTS

| | | | |
|---|---|---|---|
| D. 175,292 | 8/1955 | Austgen | D30/160 |
| D. 233,770 | 11/1974 | Clark et al. | D30/160 |
| 1,912,704 | 6/1933 | Graham | 119/26 |
| 1,956,652 | 5/1934 | Oliver | 119/26 |
| 1,961,171 | 6/1934 | Sanford | 119/26 |
| 2,013,058 | 9/1935 | Leindorf | 119/26 |
| 2,531,915 | 11/1950 | Maly | 119/26 |
| 2,707,936 | 5/1955 | Kiehl | 119/26 |
| 2,707,937 | 5/1955 | Herman | 119/26 |
| 2,718,209 | 9/1955 | Ross | 119/26 |
| 2,725,851 | 12/1955 | Futterer | 119/26 |
| 2,796,043 | 6/1957 | Albert | 119/24 |
| 3,104,648 | 9/1963 | Fisher | 119/26 |
| 3,123,047 | 3/1964 | Fisher | 119/29 |
| 3,476,086 | 11/1969 | Way | 119/29 |
| 4,542,714 | 9/1985 | Ingraham et al. | 119/29 |
| 4,803,953 | 2/1989 | Graves | 119/29 |

*Primary Examiner*—Paul J. Hirsch
*Attorney, Agent, or Firm*—David W. Collins

[57] ABSTRACT

Bird toys (10) are provided, tailored to specific sizes of exotic birds. The toys all have at least three of the following elements present: at least one piece of wood (12) of intermediate hardness, such as eucalyptus, a bell (20), at least one piece of leather (18), at least one strip of rawhide (14), at least one length of hemp (28), at least one plastic baby toy (26, 30), and at least one bead (16) (plastic or wood). The elements may be mounted on a length of chain, rope, or wire (22), and suspended from a part of a bird cage by a key-ring (24) or from a cantilevered support perch (32) attached to the side of the cage.

22 Claims, 5 Drawing Sheets

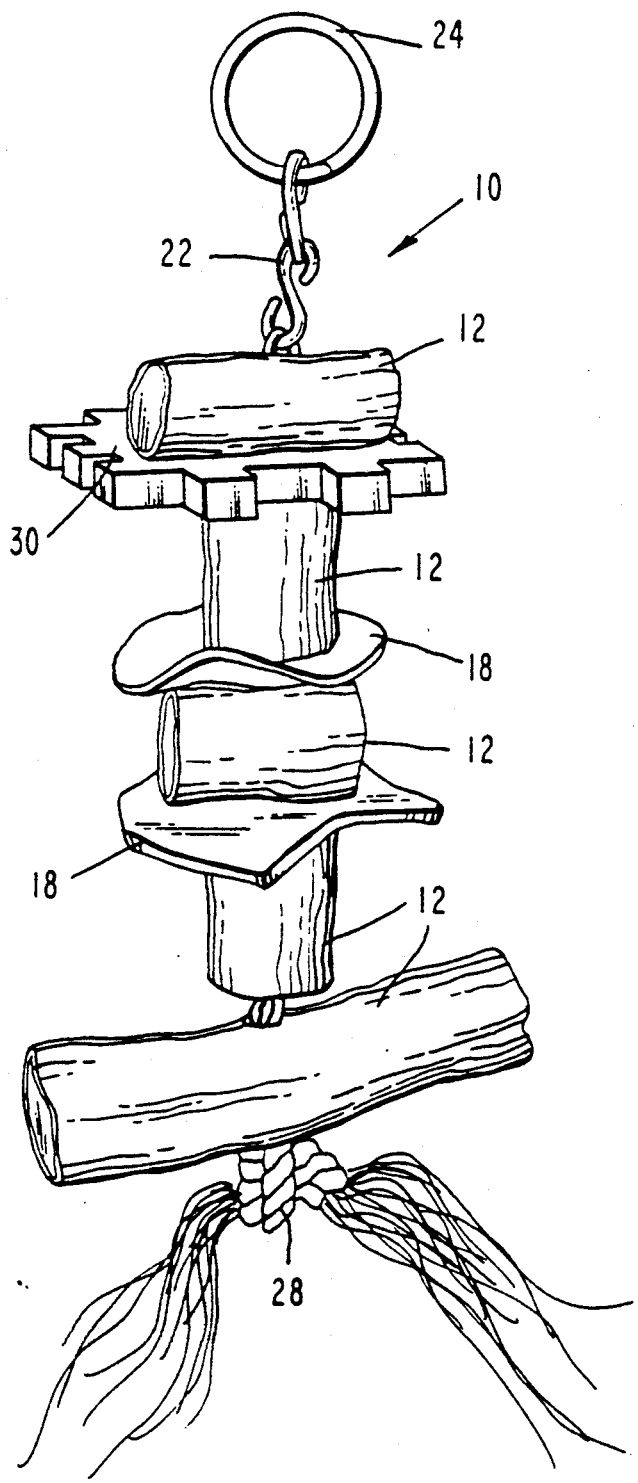

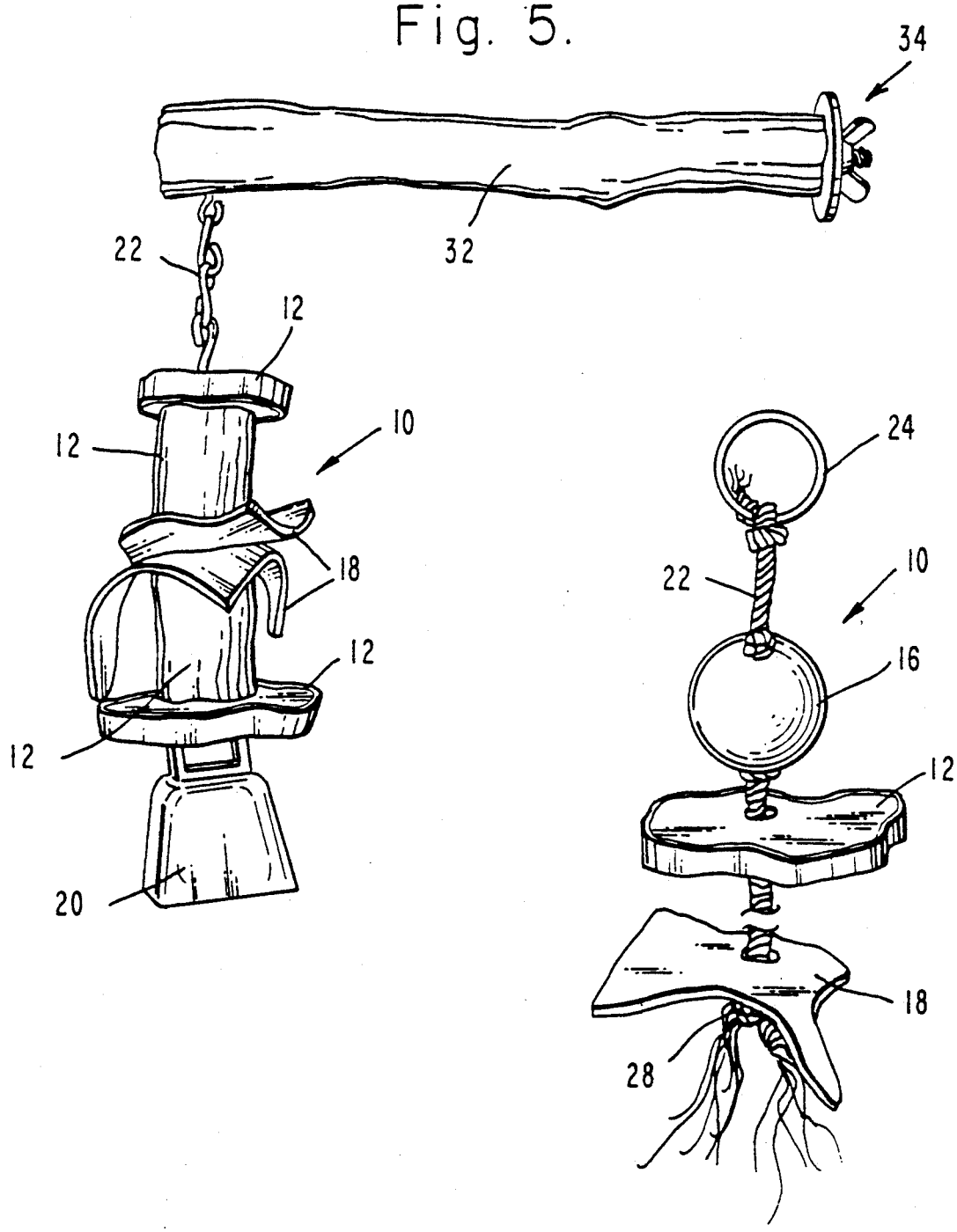

BIRD TOYS

TECHNICAL FIELD

The present invention relates to toys for birds, particularly exotic birds.

BACKGROUND ART

As fewer people can afford single family homes and thus are turning to condominiums and apartments in which to live, birds, especially exotic birds such as cockatiels, cockatoos, Amazons, African grays, macaws, etc. are finding increasing favor as pets. Condominium associations and landlords are apt to prefer birds over cats and especially dogs as pets on the premises.

Birds now rank third, behind cats and dogs, as the most favorite pets in America. There are now almost 45 million pet birds in the U.S.

There has been a lack of suitable toys for birds, other than perhaps a mirror or a bell. Wood has sometimes been used, since it is known to be useful in keeping the beak clean and in shape, reduces overgrown beaks, and keeps the birds occupied. However, the typical wood employed has been either manzanita or pine. The former is too hard for most birds to work on, and they soon give up; the latter is too soft, and the birds quickly destroy the wood.

Of course, the needs of larger birds, such as macaw parrots, are different than those of intermediate size birds, such as cockatoos, Amazon parrots, African gray parrots, and toucans, which are in turn different than those of smaller birds, such conures, cockatiels, and parakeets.

Thus, there is a perceived need for a line of bird toys, tailored to the particular needs of the variety of the bird.

DISCLOSURE OF INVENTION

In accordance with the invention, bird toys are provided. Although the toys are tailored to specific sizes of birds, all the toys have at least three of the following elements present: at least one piece of wood of intermediate hardness, such as eucalyptus, a bell, at least one piece of leather, at least one strip of rawhide, at least one length of hemp, at least one plastic baby toy, and at least one bead (plastic or wood). The elements may be mounted on a length of chain, rope, or wire, and suspended from a part of a cage by a key-ring or from a cantilevered support attached to the side of the cage.

The eucalyptus wood provides a source of eucalyptus oil, which repels mites and lice and replenishes oil in the feet of the bird. The wood is hard enough to entertain the bird for a number of weeks, yet not so hard that the bird gives up.

The bell provides a sound for the bird to experience. The leather, rawhide, plastic baby toy, and ball provide additional sources of chewing, while the hemp is preened by the bird, instead of its own breast feathers.

The bird toys of the invention have found instant acceptance in the market place.

BRIEF DESCRIPTION OF THE DRAWINGS

FIGS. 1-6 are perspective views of examples of various bird toys suitable for pet birds, in accordance with the invention.

BEST MODES FOR CARRYING OUT THE INVENTION

Figure 1:
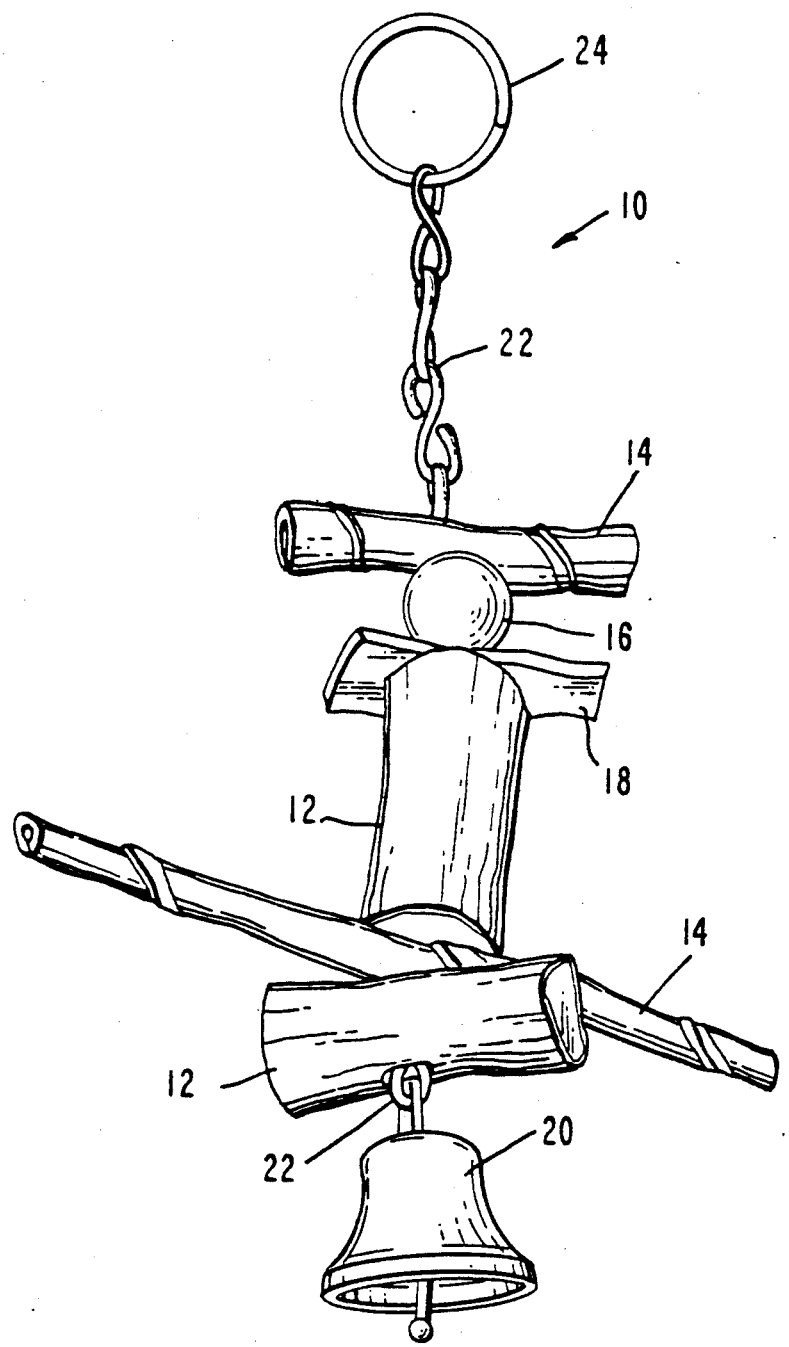

Referring now to the drawings, FIG. 1 is an example of a bird toy 10 suitable for small birds, such as parakeets, cockatiels, conures, and small Amazons. The toy comprises several pieces, here, two, of eucalyptus wood 12, at least one strip of rawhide 14 (here, two rolled strips are shown), a bead 16, a piece of leather 18, and a bell 20. The elements 12, 14, 16, 18, 20 are suspended on a support chain 12. The top of the chain 22 is secured to a key-ring 24 for suspending the toy 10 in the bird cage (not shown).

It will be appreciated that the length and diameter of the wood pieces 12 is not per se critical, other than to be of dimensions suitable for these smaller birds. As an example, the wood pieces may be about 1 to 2 inches long and about $\frac{1}{2}$ to 1 inches in diameter. The wood pieces 12 may be attached to the support chain 22 either along the axis of the wood (axially) or perpendicular thereto (radially).

Similarly, the dimensions of the rawhide strips 14 are not per se critical. For small birds, the diameter of the strip is about $\frac{1}{4}$ to $\frac{1}{2}$ inches and the length is about 1 to $1\frac{1}{2}$ inches. Rawhide strips are available from Leathercraft Co. (Conshohoken, Pa.).

The diameter of the bead 16 ranges from about 16 to 20 mm for small birds. The ball may comprise wood, such as birch, which has been colored with food dye by soaking for a period of time sufficient to impart color to the wood. Wood beads (uncolored) are available from, e.g., King Wood Turning (Los Angeles, Calif.). Wood is provided as an additional source of chewing for the bird. The color is provided for aesthetics.

Alternatively, the bead 16 may comprise a colored plastic, which is of a non-toxic material. Plastic beads are available from, e.g., The Beadery (Hope Valley, R.I.).

A leather strip 18 is provided, also as a chewing source. The leather is vegetable-tanned, to avoid an toxicity to the birds. For small birds, the leather strip typically measures about $\frac{1}{2}$ inch by 1 inch by 1/16 inch thick. One source of vegetable-tanned leather is MacPherson Leather Co. (Los Angeles, Calif.).

In the bird toy shown in FIG. 1, a dome bell 20 is provided for sound; this is used to keep the bird's attention. For small birds, the size of the dome bell 20 is 32 mm. Dome bells are available from, e.g., Westrim (Northridge, Calif.).

The various elements of the wood 12, rawhide 14, ball 16, leather strip 18 and dome bell 20 are suspended on a strip of chain 22, with the bell at the bottom-most portion thereof and a suspending member 24, here, a key-ring, at the top-most portion thereof. The key-ring is 1 inch in diameter and is available from, e.g., Lucky Line (San Diego, Calif.). The chain is #14 jack chain, available from, e.g., Security Chain Co. (Portland, Oreg.). The toy 10 is suitably suspended from a portion of the cage where the bird can reach it.

Figure 2:
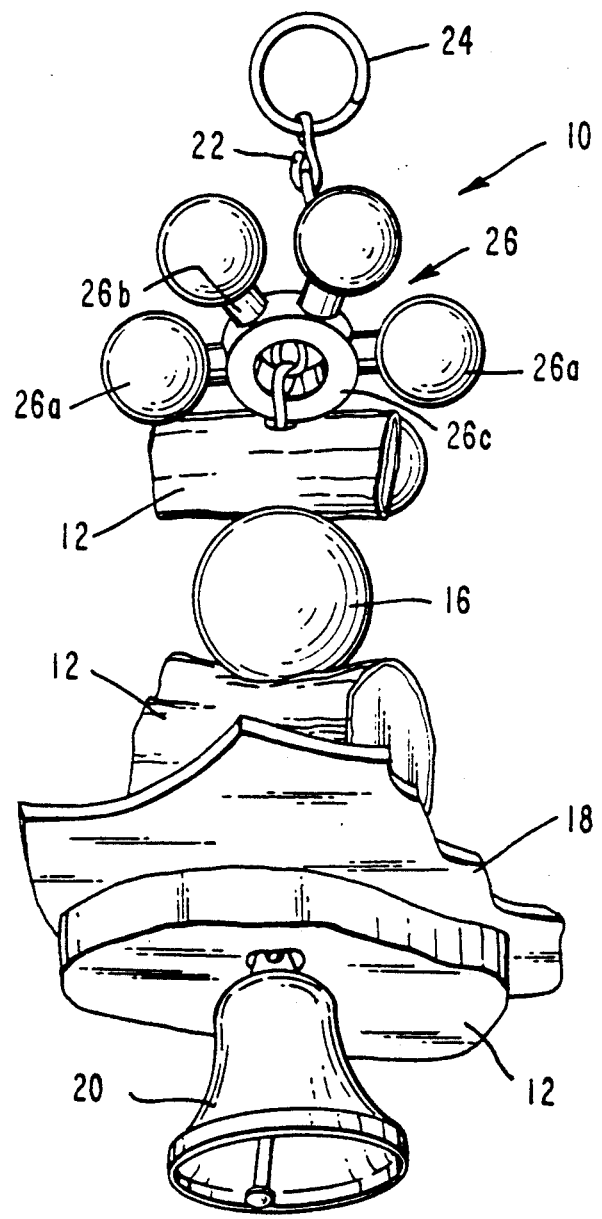

FIG. 2 depicts an example of a bird toy 10 suitable for a medium size bird, such as an Amazon or small cockatoo. This toy comprises three pieces of wood (eucalyptus) 12, a wood bead 16, a strip of leather 18, a dome bell 20, and a baby teething plastic toy 26. As in FIG. 1, the elements are suspended on a length of chain 22, with a key-ring 24 at the top-most portion thereof.

The baby teething plastic toy 26 depicted here comprises six balls 26a attached by spokes 26b to a central ring 26c, and is known as a "Star", which is available from DMA Industries, Champlain, N.Y. Because it is made for babies, the toy is non-toxic. The plastic toy 26 is yet another item for chewing by the birds.

For intermediate size birds, the various elements, if present, have the following dimensions: the length of the wood pieces 12 may range from about 1½ to 2½ inches and the diameter may range from about ½ to 1½ inches. The diameter of the rawhide piece (bone shape) 14 is about ¾ to 1¼ inches and the length is about 3 to 4 inches. The diameter of the bead 16, whether wood or plastic, ranges from about 1¼ to 1½ inches. The leather strip 18 typically measures about 2 inches by 2 inches by 3/16 inch thick. A dome bell may be used, as shown in FIG. 2, having a size of 45 mm. Alternatively, a cowbell, such as shown in FIG. 5, may be used. The size of a cowbell 20 for an intermediate size bird is 1¾×1¼ inches. The key-ring and chain have the same dimensions as for a small bird.

Figure 3:
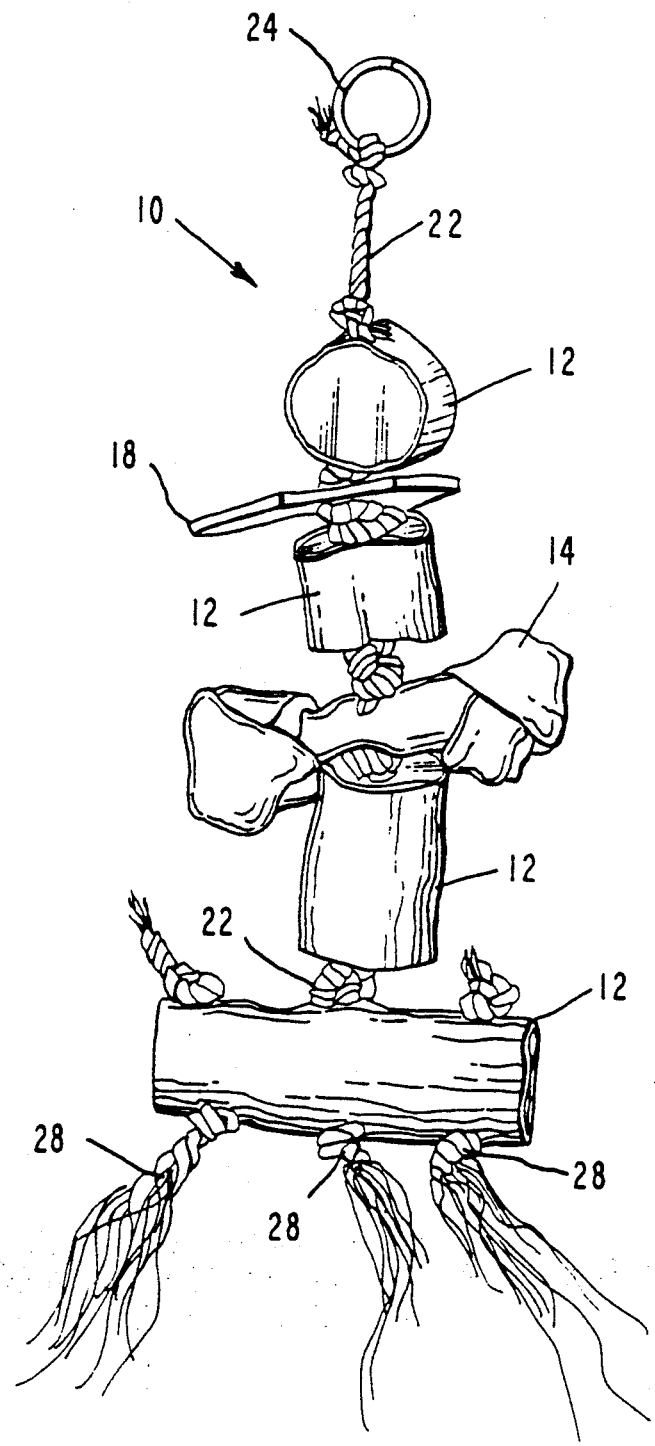

FIG. 3 depicts an example of a bird toy 10 for a large exotic bird, such as a cockatoo or a macaw. In this toy, several wood pieces 12 are employed. A rawhide piece 14, larger than that used for smaller birds, is used. Also, a strip of leather 18 is used. Finally, several pieces of hemp 28 are attached to the bottom piece of wood.

The hemp 28 is typically ¼ inch in diameter and is available from, e.g., Pacific Fiber (Wilmington, Calif.). The end of the hemp may be frayed or not.

Birds use the hemp 28 to preen, instead of plucking breast feathers, which they often do when bored. The use of hemp for preening resulted, for example, in one bird, having previously plucked all its breast feathers out, with completely restored breast feathers within six months.

The elements are supported from a length of rope 22. A key-ring 24 is attached to the top-most part thereof.

For large birds, the length of the wood pieces 12 may range from about 6 to 7 inches and the diameter may range from about 2 to 3 inches. The diameter of the rawhide strip 14 is about 1 to 1½ inches and the length is about 3 to 4 inches. The diameter of the bead 16, whether wood or plastic, ranges from about 1¼ to 2 inches. The leather strip 18 typically measures about 2½ inches by 2½ inches by 3/16 inch thick. The key-ring 24 is 1¼ inches in diameter. If chain is used as the suspending agent 22, it is preferably #12 jack chain.

For large birds, a cowbell, such as shown in FIG. 5, may be used in conjunction with two or more of the preceding elements. The size of a cowbell 20 for a large bird may be 2×1¼ inches.

FIG. 4 depicts yet another toy 10 for large birds. The toy comprises several pieces of wood 12, two strips of leather 18, and terminates with lengths of hemp 28. The elements are supported from a length of chain 22, with a key-ring 24 attached to the top-most part thereof. The toy 10 also includes a baby plastic toy 30, known as a "Waffle" and available from Little Tykes (Hudson, Ohio).

FIG. 5 shows an alternative method of attaching the toy 10 to the bird cage, using a perch 32, with clamping means 34, which permits securing the perch to the side of the cage. In this toy, a cowbell 20 is attached to the bottom of the chain 22.

FIG. 6 depicts a portion of a toy 10, showing a plastic bead 16 in conjunction with other elements.

INDUSTRIAL APPLICABILITY

The bird toys 10 described herein are enjoying commercial acceptance in the market place.

What is claimed is:

1. A bird toy for exotic birds comprising:
  (a) a suspending medium having a top portion and a bottom portion;
  (b) at least one piece of wood of intermediate hardness suspending from said suspending medium, said piece of wood adapted for chewing by an exotic bird;
  (c) a plurality of elements suspended from said suspending medium, said elements selected from the group consisting of a bell, at least one length of hemp, at least one strip of rawhide, at least one length of hemp, at least one plastic baby toy, and at least one bead, said at least one piece of wood and each of said elements positioned in a linear fashion on said suspending medium, such that each is suspended one below the other; and
  (d) means for attaching said top portion in a position to permit a bird to have access thereto.

2. The bird toy of claim 1 comprising at least two of said elements.

3. The bird toy of claim 2 comprising at least three of said elements.

4. The bird toy of claim 1 wherein said suspending medium is selected from the group consisting of chain, rope, and wire.

5. The bird toy of claim 1 wherein said wood is eucalyptus.

6. The bird toy of claim 1 wherein said at least one piece of leather is vegetable-tanned.

7. The bird toy of claim I wherein said bead is wood or plastic.

8. The bird toy of claim 7 wherein said bead is birch wood, dyed with food coloring.

9. The bird toy of claim 1 wherein said attaching means comprises a key-ring.

10. The bird toy of claim 1 wherein said attaching means comprises a perch having a suspending end and an attaching end, said suspending medium attached to said suspending end and said attaching end provided with clamp means to attach said perch to a portion of a bird cage.

11. A bird toy for exotic birds comprising:
  (a) a suspending medium having a top portion and bottom portion;
  (b) at least one piece of eucalyptus wood suspended from said suspending medium, said piece of wood adapted for chewing by an exotic bird;
  (c) at least two additional elements suspended from said suspending medium, said elements selected from the group consisting of a bell, at least one piece of vegetable-tanned leather, at least one strip of rawhide, at least one length of hemp, at least one plastic baby toy, and at least one bead, said at least one piece of wood and each of said elements positioned in a linear fashion on said suspending medium, such that each is suspended one below the other; and
  (e) means for attaching said top portion in a position to permit a bird to have access thereto.

12. The bird toy of claim 11 comprising at least three of said elements.

13. The bird toy of claim 11 wherein said suspending medium is selected from the group consisting of chain, rope, and wire.

14. The bird toy of claim 11 wherein said bead is wood or plastic.

15. The bird toy of claim 14 wherein said bead is birch wood, dyed with food coloring.

16. The bird toy of claim 11 wherein said attaching means comprises a key-ring.

17. The bird toy of claim 11 wherein said attaching means comprises a perch having a suspending end and an attaching end, said suspending medium attached to said suspending end and said attaching end provided with clamp means to attach said perch to a portion of a bird cage.

18. A bird toy for exotic birds comprising:
(a) a suspending medium having a top portion and a bottom portion;
(b) at least one piece of eucalyptus wood suspended from said suspending medium, said piece of wood adapted for chewing by an exotic bird;
(c) at least one length of hemp, one end of which is suspended from said suspending medium or said at least one piece of eucalyptus wood, the other end of said length of hemp being free for preening by said bird;
(c) at least one additional element suspended from said suspending medium, said element selected from the group consisting of a bell, at least one piece of vegetable-tanned leather, at least one strip of rawhide, at least one plastic baby toy, and at least one bead, said at least one piece of wood and each of said elements positioned in a linear fashion on said suspending medium, such that each is suspended one below the other; and
(e) means for attaching said top portion in a position to permit a bird to have access thereto.

19. The bird toy of claim 18 comprising two additional elements: at least one piece of vegetable-tanned leather and at least one strip of rawhide.

20. The bird toy of claim 18 wherein said suspending medium comprises rope.

21. The bird toy of claim 18 wherein said attaching means comprises a key-ring.

22. The bird toy of claim 18 wherein said attaching means comprises a perch having a suspending end and an attaching end, said suspending medium attached to said suspending end and said attaching end provided with clamp means to attach said perch to a portion of a bird cage.

* * * * *